(12) United States Patent
Mantell et al.

(10) Patent No.: US 6,307,645 B1
(45) Date of Patent: Oct. 23, 2001

(54) HALFTONING FOR HI-FI COLOR INKS

(75) Inventors: David A. Mantell, Rochester; Thyagarajan Balasubramanian, Webster, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/218,771

(22) Filed: Dec. 22, 1998

(51) Int. Cl.$^7$ ................................. H04N 1/52; H04N 1/60
(52) U.S. Cl. ........................ 358/1.9; 358/536; 358/518; 358/520
(58) Field of Search ..................... 358/1.9, 536, 535, 358/534, 298, 456, 457, 458, 459, 518, 519, 520, 521, 525; 382/167, 162

(56) References Cited

U.S. PATENT DOCUMENTS

| | | |
|---|---|---|
| 4,275,413 | 6/1981 | Sakamoto et al. . |
| 4,500,919 | 2/1985 | Schreiber . |
| 4,812,899 | 3/1989 | Kueppers . |
| 4,893,179 | 1/1990 | Ito . |
| 4,908,638 | 3/1990 | Albosta et al. ................ 346/140 |
| 5,047,844 | 9/1991 | Ikeda et al. . |
| 5,077,604 | 12/1991 | Kivolowitz et al. . |
| 5,087,126 | 2/1992 | Pochieh ........................ 356/402 |
| 5,107,331 * | 4/1992 | Collell et al. ................... 358/536 |
| 5,136,372 | 8/1992 | Nakatani et al. . |
| 5,140,411 | 8/1992 | Haneda et al. . |
| 5,208,663 | 5/1993 | Hiratsuka et al. . |
| 5,510,910 | 4/1996 | Bockman et al. .............. 358/502 |
| 5,528,386 | 6/1996 | Rolleston et al. ............. 358/522 |
| 5,565,113 | 10/1996 | Hadimioglu et al. .............. 216/2 |
| 5,870,530 | 2/1999 | Balasubramanian ........... 395/109 |
| 5,892,891 | 4/1999 | Dalal et al. .................... 395/109 |

FOREIGN PATENT DOCUMENTS

0438271 * 7/1991 (EP) ......................... H04N/1/46

OTHER PUBLICATIONS

Ostromoukhov, "Chromaticity Gamut Enhancement by Heptatone Multi–Color Printing," SPIE, vol. 1909, p. 139, Jun. 1993.

Boll, "A Color to Colorant Transformation for a Seven Ink Process," IS&T–SPIE Symposium, Science and Technology, Feb. 1994.

"New era of Digital Photo Printing . . . ", Hard Copy Observer, Oct. 1996, p. 1.

* cited by examiner

*Primary Examiner*—Scott Rogers
(74) *Attorney, Agent, or Firm*—Fay, Sharpe, Fagan, Minnich & McKee, LLP

(57) ABSTRACT

In a hi-fi color printing system, an inverted halftone screen is provided having the same angle and frequency as a halftone screen for an opposing color. The dots of the inverse halftone screen are configured to be located midway between the centers of the dots of the half-tone screen. The halftone screen and inverted halftone screen are used in the printing process to extend the gamut of colors within a printing system, render improved neutral colors, and provide an improved transition through neutral regions of color space. The present invention allows for additional printing of multiple colors without the need for increasing the number of screens used in the image processing system.

19 Claims, 4 Drawing Sheets

HALFTONING FOR HI-FI COLOR INKS

BACKGROUND OF THE INVENTION

The present invention relates to digital printing systems, in which images based on electronic image signals are printed. More specifically, the present invention relates to a halftone screen which allows for the printing of colors having substantially opposite hues in order to extend the color gamut, generate improved neutral colors, and smooth transitions through color space.

FIG. 1 depicts a representative "slice" of color space in the visible spectrum, showing the additive and subtractive primary colors. As is known in the art of color science, the slice illustrated in FIG. 1 is a section of a three-dimensional color space, with a white-to-black neutral axis emerging from the center of the diagram out of the page.

Around the perimeter of the section of color space are shown locations representing a full saturation of the subtractive primary colors yellow (Y), magenta (M), and cyan (C). These subtractive colors, as is well known, are used in the printing of images, because combinations of these colors can theoretically simulate all other colors in the visible spectrum.

Located between the various pairs of subtractive primary colors in the color space are what are here called the "hi-fi" colors, blue (B), red (R), and green (G). As can be seen in FIG. 1, each hi-fi color can theoretically be simulated by combining, such as on a printed surface, colorants (such as toner or ink) of the two adjacent primary colors, so that magenta plus cyan together on a printed sheet would yield blue, while cyan and yellow would produce green, and so forth. However, this theoretical mixing of primary colors to yield other colors may result in a limited printer gamut. The inevitable chemical shortcomings of typical colorant compositions will often cause combinations of primary colorants to yield a sub-optimal rendering of the desired combination color.

Within the shape shown in FIG. 1, wherein colors of any kind will be more vivid (i.e., have higher chroma) as one approaches the perimeter, the shaded area bounded by solid curved lines represents a typical practical gamut of colors obtainable with the printing apparatus. If it is attempted to print one of the primary colors, such as yellow, a yellow colorant is applied to the sheet, unalloyed with any other color; in such a case, pure yellow colorant will yield the theoretical maximum chrominance of the desired color. This optimal use of uncombined primary color is represented by the fact that the solid curved line within the shape substantially meets the perimeter of the shape only at the point of pure color, when yellow colorant is not combined with any magenta or cyan colorant.

However, if it is desired, for example, to print a green area, there must be supplied onto the paper a visually-effective combination of yellow with cyan. As long as one primary color dominates, almost optimal chrominance can be achieved, as is shown by the fact the curved solid line is reasonably close to the shape when yellow or cyan dominates. When colors toward a pure green are desired, which would require close to a half-and-half split of the two types of colorant, the lack of chrominance becomes noticeable, as shown in FIG. 1 by the fact that, near the area marked G, the solid curved line is quite far from the corner of the shape which represents a perfect green. In practical terms, the fact that the solid curved line is far from the perimeter of the shape results in a distinct dull or grayish appearance when the combination color is attempted. A similar lack of chrominance will appear when other hi-fi hues, such as red or blue, are attempted to be printed with close-to-equal proportions of subtractive colors.

It has been proposed, particularly in the art of xerographic printing and other ink jet and acoustic ink printing, to overcome the problem of obtaining the hi-fi hues by providing a printing apparatus which lays down not only the CMY primary colors, but also one or more apparatus (such as development units) which lay down one or more types of colorant to print hi-fi hues, such as RGB. Instead of trying to obtain, for example, pure blue by mixing magenta and cyan colorants, such a system would simply lay down a dedicated blue colorant. With the addition of a black (K) development unit such as for printing of text, improving an achievable optical density, and to help create neutral grays, such "hi-fi" color printing systems would typically include five or more development units.

Color printing on halftone printers involves the formation of color separations as halftone screens for each color which is to be used to form a color image. The halftone screens are laid down in a predetermined overlapping relationship to each other which result in generation of the desired color image. A well known problem when overlapping two or more halftone screens is the possibility of developing a moiré pattern or other form of interference, when the screens are not properly positioned. To avoid the moiré or other undesirable patterns, precise angle combinations of the screens are required. It is known that increasing the difference in an angle of two overlaid screens will result in a smaller pattern, making the pattern less apparent. It is noted that a 90° screen is essentially the same as one at 0°, just as a 135° screen is the same as a 45° screen (though with asymmetrical dot shapes, the orientation of the dots varies around the full 360° arc, - - - this is not a major factor in moiré patterning). Thus, the largest possible angle difference between two overlaid screens is 45°.

If a two-color print is to be generated, the angles of the two color screens should be separated by 45°. The dominant color is normally located at 45° since it will be less apparent, and the secondary color - - - often black, at 0°. In consideration of the foregoing, when three screens are used in a printing process, the maximum angle difference offset is 30°.

While images of two or three colors arc at times used, it is also common that four process colors are used in color image printing. The printing industry has therefore, generated a standardized combination of four halftone angles. In particular, cyan is located at 15°, black at 45°, magenta at 75° and yellow at 0°. Since yellow is the lightest and least noticeable color, it can be set at 0°, even though 0° is a highly noticeable angle, and it is only 15° from the nearest neighbor. In some embodiments, cyan is known to be set at 105°, however, with symmetrical dots this is substantially the same as 15° (and even with asymmetrical dots, it does not make a large difference).

When four process colors using the above angle combinations are overlaid, the resulting moiré or other interference patterns arc as small as possible. However, if these angles are off even a slight amount, problems with the image will occur.

It is known that many color printing systems will include five or more development units having different color colorants. Attempting to incorporate these additional colors is difficult, especially if each color must have a unique halftone angle. Particularly, once there are more than four angles, which must be laid down, the patterning problems discussed above are greatly increased. A known solution to limiting the angles which are incorporated in the printing process is to use the same halftone angle for colors at opposing hue regions such as red or orange used at the same angle as cyan, green used at the same angle as magenta, blue used at the same angle as yellow, and black used at the same angle as gold or silver.

A limitation placed on the use of the same halftone angles for colors of opposing hues is that the opposed colorants are not to be simultaneously printed. This constraint exists in order to prevent registration errors which degrade the output print.

It has been considered desirable to determine a manner which would allow for a relaxation of the limitation against a simultaneous printing of opposed colorants. In particular the present invention is directed to an arrangement which relaxes the constraint that the two opposed colorants be mutually exclusive at any given pixel location.

There are numerous teachings for converting a color signal in one color space to another color space. Such processing are understood to use halftone screens for color printing. A sampling of such teachings are provided below, and are hereby incorporated by reference.

In the prior art, U.S. Pat. No. 4,275,413 discloses a linear interpolation method for locating outputs of a three-dimensional look-up table, such as to convert a desired color from RGB to CMY color space.

U.S. Pat. No. 4,500,919 discloses a basic technique for obtaining a specific desired color from signals representative of various primary colors.

U.S. Pat. No. 4,812,899 discloses a printing technique in which the picture surface is divided into subsurfaces of identical size, with every subsurface divided into juxtaposed elemental surfaces which form a chromatic component and an achromatic component. The elemental surfaces which form the chromatic component are printed with a maximum of two of six chromatic printing inks, such as yellow, orange-red, magenta-red, violet-blue, cyan-blue, green and black.

U.S. Pat. No. 4,893,179 discloses a digital copier including a decomposing circuit for decomposing a color image into three fundamental colors. The original RGB data derived from the original decomposition is then converted to CMYK data for xerographically printing the image.

U.S. Pat. No. 5,047,844 discloses a color printing apparatus in which an edge portion of an achromatic area is detected to emphasize the edge portion and reduce the density of a chromatic area near the edge portion. This technique results in a reduction of color bleeding.

U.S. Pat. No. 5,077,604 discloses a method for converting RGB color separation signals into an equivalent CMYK image signals.

U.S. Pat. No. 5,087,126 discloses a method of estimating a combination of fundamental colors which corresponds to a target color desired to be printed.

U.S. Pat. No. 5,136,372 discloses a color xerographic printer. A spatial frequency detector detects a spatial frequency relating to an image of a prescribed color for every portion of an image to be formed. The images are formed with different xerographic techniques, depending on whether there is high spatial frequency of the image desired to be printed.

U.S. Pat. No. 5,140,411 discloses a color image reader, in which light from the original image is divided, by means of a prism, into separate components which can be fed to a discriminator for discriminating between a chromatic portion of the light image and an achromatic portion of the light image.

U.S. Pat. No. 5,208,663 discloses an image processing apparatus in which color image data is classified as including either an achromatic color, a chromatic color, or an intermediate color. The apparatus further includes a discrimination circuit for discriminating a kind of the original image on the basis of the color image data, with a classifying circuit being capable of changing the classifying criterion in accordance with the discriminated kind of the original image.

U.S. Pat. No. 5,510,910 discloses a technique of merging color signals to map control signals for a CRT through a common perceptual space into printer control signals.

U.S. Pat. No. 5,528,386 describes an apparatus for taking an original RGB image and converting the signals therefrom to a CMYK image which can be fed to a printing apparatus.

Ostromoukhov, "Chromaticity Gamut Enhancement by Heptatone Multi-Color Printing," SPIE, Volume 1909, page 139, June, 1993, gives an overview of the basic techniques of extending a CMYK printing process to a CMYKRGB printing process.

Boll, "A Color to Colorant Transformation for a Seven Ink Process," presented at the IS&T-SPIE Symposium on Electronic Imaging, Science and Technology, February 1994, discloses the selection of a primary color to obtain desired color in a CMYKRGB apparatus. The disclosed technique subdivides the gamut formed by the seven possible colorants into smaller groupings. A series of four-colorant subsets from the seven-ink superset of CMYKRGB are individually characterized and a calorimetric transform was obtained for each subset. In color space each of the four-colorant subsets represent adjacent and overlapping subgamuts of the seven-colorant gamut.

The article "New Era of Digital Photo Printing . . . ", *Hard Copy Observer*, October 1996, p.1, and its ancillary articles, discloses currently popular techniques for gamut enhancement, particularly in regard to ink-jet printing. Among these techniques are using primary color inks of different densities (e.g. a dark cyan ink and a light cyan ink), or adding orange and green primary inks (this is known as the Pantone "hexachrome" system).

U.S. patent application Ser. No. D/96095 entitled System for Printing Color Images With Extra Colorants In Addition to Primary Colorants.

U.S. patent application Ser. No. D/96099 entitled System for Printing Color Images With Extra Colorants in Addition to Primary Colorants.

SUMMARY OF THE INVENTION According to one aspect of the present invention, there is provided a printing apparatus capable of printing multi-color images. The printing apparatus uses halftone screens for each of the colors used in the printing operation. A first halftone screen is provided including a plurality of dots, where the first halftone screen is also arranged at a first angle. A second halftone screen also having a plurality of dots is then formed and also arranged at the first angle, and further is inverse to the first halftone screen. The inverse halftone screen is offset from the first halftone screen whereby the dots of the inverse halftone screen are midway between centers of two dots of the first halftone screen. In accordance with another aspect of the present invention, the printing apparatus allows for a simultaneous printing of colors having opposite hues at substantially the same pixel area.

A first benefit of the present invention is found in extending the color gamut of which an image may be printed. A second benefit of the present invention permits simultaneous printing of colors of opposing hues at the same screen angle without mis-registration artifacts. A further benefit of the present invention allows for the generation of high-fidelity grays by the combination of colors having opposing hues. Still yet another advantage of the present invention is allowing a smooth transition through the color space from a first color hue to an opposing color hue whereby a black application of color is not necessary for the intermediate gray area.

BRIEF DESCRIPTION OF THE DRAWINGS

The invention will be better understood and objects other than those set forth above will become apparent when consideration is given to the following detailed description thereof. Such description makes reference to the drawings wherein.

DETAILED DESCRIPTION OF THE INVENTION

Figure 1:
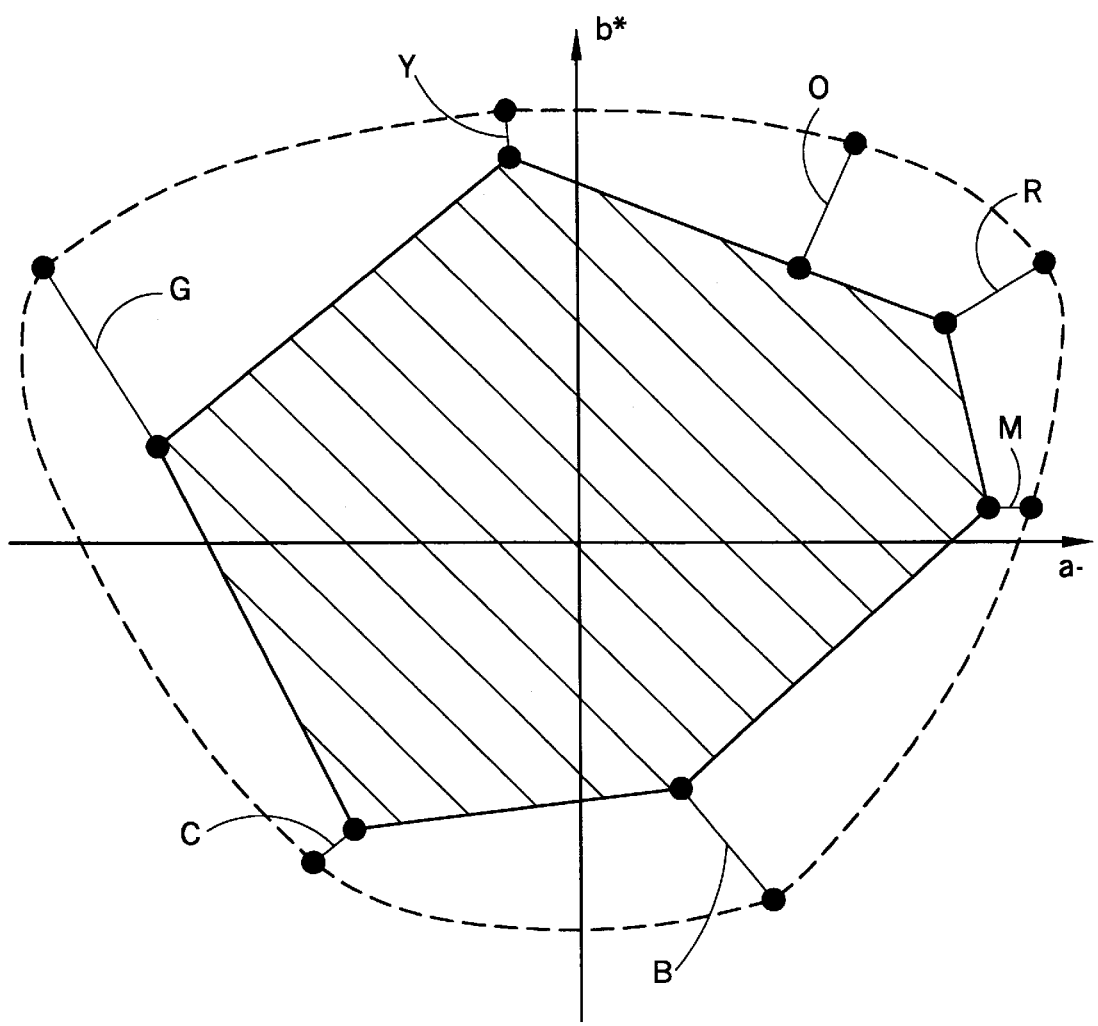
FIG. 1 shows a representative section of color space illustrating a principle of "hi-fi" color according to the present invention.
Figure 2:
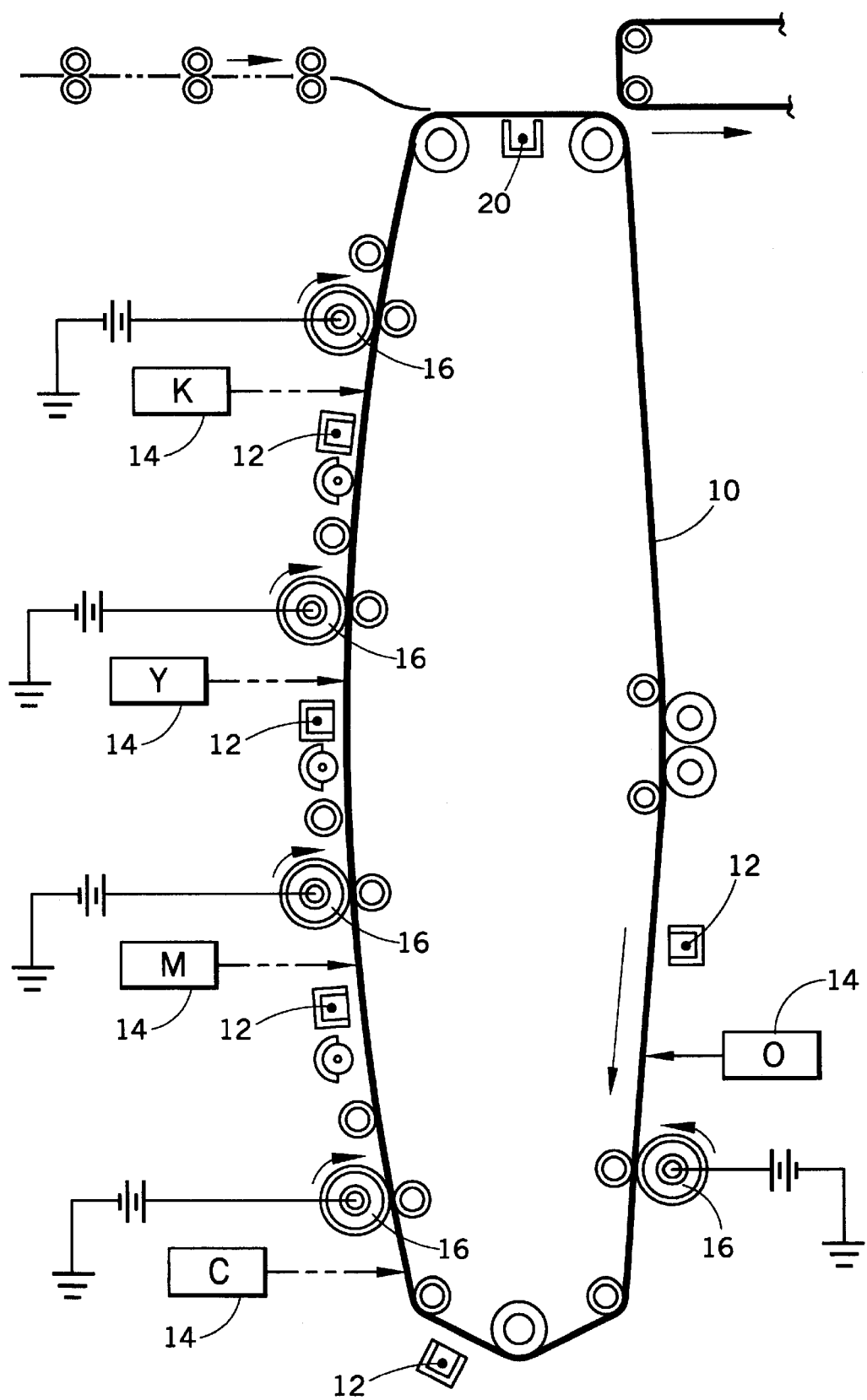
FIG. 2 is a simplified elevational view showing the essential portions of a xerographic engine suitable for image-on-image printing of full-color images.

FIG. 2 is a simplified elevational view showing the essential portions of a xerographic engine suitable for image-on-image printing of full-color images. Although one embodiment of the invention involves printing an image using image-on-image xerography as will be described, the claimed methods can be applied to any color printing system, including ink-jet, lithography, acoustic ink printing (AIP), etc. (examples of AIP systems are shown in U.S. Pat. Nos. 5,565,113 and 4,908,638; hereby incorporated by reference).

In the particular architecture of FIG. 2 of the present invention, a series of development units successively lay down different primary-colored toners on a single photoreceptor, and the accumulated different-colored toners are then transferred to a print sheet, such as a sheet of paper. As shown in FIG. 2, photoreceptor belt 10 is entrained around a series of rollers, and along the circumference of photoreceptor belt 10 are disposed a series of charge corotrons, each indicated as 12, exposure devices indicated as 14, which, as known in the art, could comprise for example an independent laser scanner or LED print bar, and developing apparatus, such as charged donor rolls 16, which apply appropriately-charged toner to the suitably charged or discharged areas created by exposure devices 14. A person of skill in the art of printing will appreciate that each combination of charge corotron 12, exposure device 14, and development unit 16 along the circumference of photoreceptor 10 represents an "imaging station" capable of placing toner of a particular primary or other color in imagewise fashion on photoreceptor 10. The location of where these colors are to be placed will, of course, be determined by the various areas discharged by the series of exposure devices 14. There may also be, disposed along photoreceptor belt 10, any number of ancillary devices, such as cleaning corotrons, cleaning blades, etc., as would be known to one of skill in the art. By causing a particular image area on the photoreceptor belt 10 to be processed by a number of stations, each station corresponding to one primary color, it is apparent that a full-color image, comprising imagewise-placed toners of the different primary colors, will eventually be built-up on photoreceptor 10. This built-up full-color image is then transferred to a print sheet, such as at transfer corotron 20, and then the print sheet is fused to fix the full-color image thereon.

In a "hi-fi" full-color printing system, an example of which is shown in FIG. 2, there are provided, in addition to the various primary-color imaging stations indicated as C, M, Y, and K, one or more additional imaging stations; in a full hi-fi color system, there would be seven such imaging stations, consisting of not only the CMYK imaging stations, but three additional imaging stations for the RGB colors as well. One additional color station, labeled O, is shown in FIG. 2.

In present printing systems which allow for the use of halftone screens having the same angle and frequency for colors at opposing hue angles a prohibition against the simultaneous printing of the two opposed colorants exists in order to prevent image artifacts due to registration errors between the opposing colors. This concept is discussed more fully in connection with FIGS. 3a–3c.

Figure 3A:
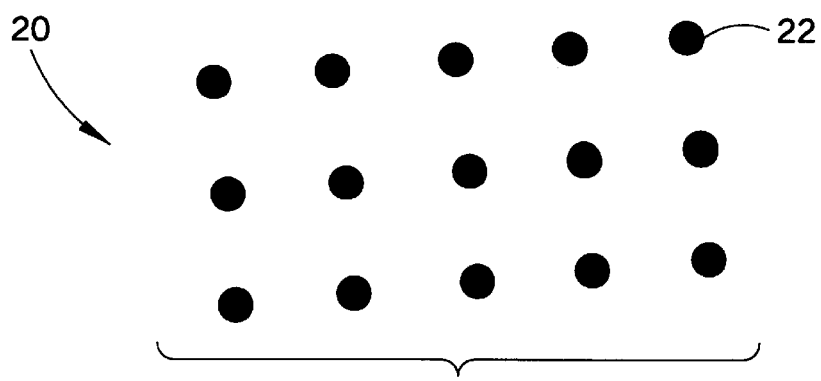
FIGS. 3a–3c are a series of illustrations showing halftone screens having the same angle and frequency aligned together for a printing procedure.
Figure 3B:
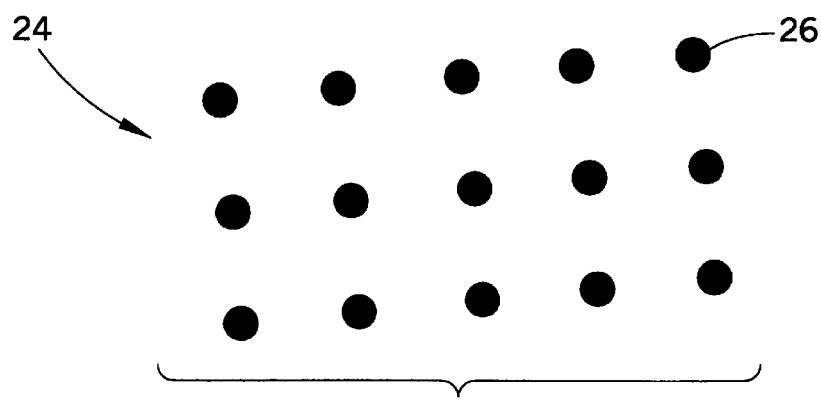
Figure 3C:
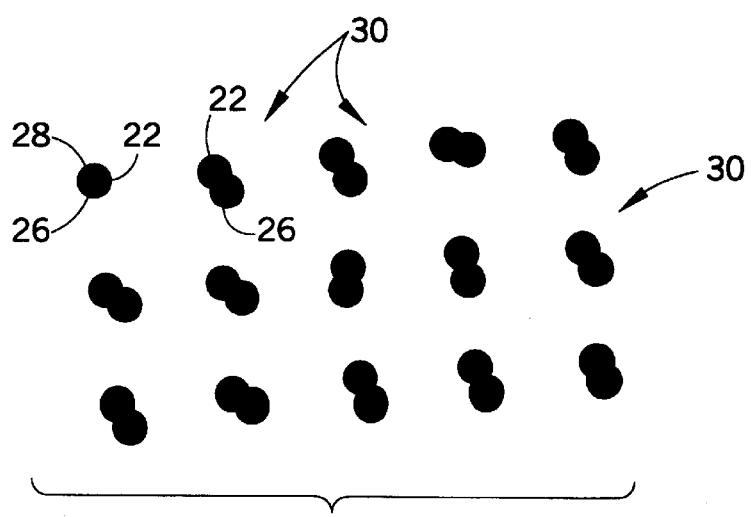

FIG. 3a represents a cyan halftone screen 20 including a plurality of dots 22. For purposes of discussion, cyan halftone screen 20 has an angle of 15° and a dot frequency of 60 lpi. FIG. 3b is a red halftone screen 24 with halftone dots 26. The red halftone screen 24 is also at 15° and has a frequency of 60 lpi. If the prohibition against simultaneous printing was not enforced, a scenario as shown in FIG. 3c could occur. Under ideal circumstances, dot combination 28 would exist where there is an exact registration between cyan dot 22 and red dot 26. However, due to imperfections in the printing process, there is a high probability that in place of an ideal registration, registration errors, i.e. misregistration, such as shown in dot combinations 30 will exist between cyan dots 22 and red dots 26. Such misregistration creates undesirable output prints. Therefore the enforcement against simultaneous printing of the two opposed colorants is a necessary requirement when using dot-on-dot printing arrangements.

On the other hand, the present invention incorporates a halftone screen with a specific angle and frequency for a first color and, an inverted halftone screen of the same angle and frequency for a second color which has a hue substantially opposite the first color. The inverted halftone screen of the present invention is equivalent to placing the two halftone screens at the same screen angle and frequency, but shifting one screen to be exactly "out of phase" with the other. This creates a dot-off-dot printing configuration such as depicted in FIGS. 4a–4c.

Figure 4A:
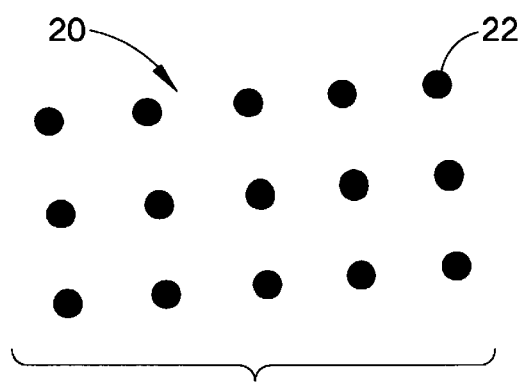
FIGS. 4a–4c illustrate a first halftone screen and a second inverse halftone screen according to the teachings of the present invention and the alignment of such screens for printing operations.
Figure 4B:
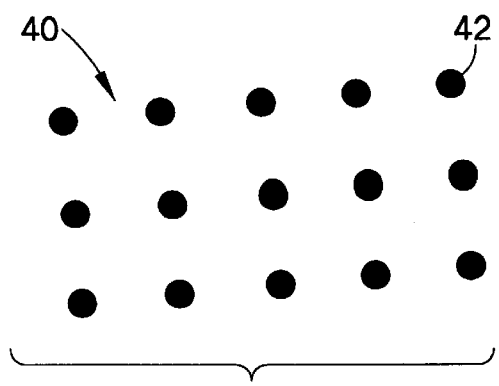

In FIG. 4a, cyan halftone screen 20 identical to that shown in FIG. 3a is illustrated. Particularly, this screen is set at a 15° angle and has a frequency of 60 lpi. However, as shown in FIG. 4b, the red halftone screen 40 which is also configured at a 15° angle and with a frequency of 60 lpi is formed such that it is inverted in relationship to cyan halftone screen 20. Particularly, the placement of its dots 42 compared to the placement of dots 22 of the cyan halftone screen 20 allow for dot-off-dot printing. The generation of the inverse screen is accomplished with known halftone formation techniques.

Figure 4C:
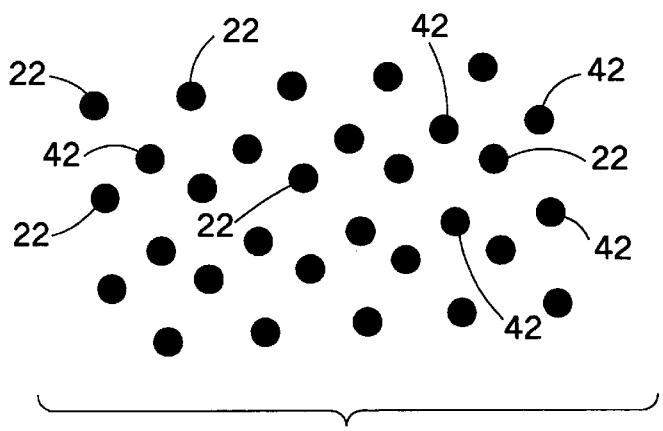

Thus, as shown in FIG. 4c red dots 42 will exist midway between the centers of cyan dots 22. Implementation of the inverted halftone screen relaxes the constraint existing in other systems, that the two opposed colorants must be mutually exclusive at any given pixel location, and allows the combined area coverage for the two colorants to approach 100%, which is far more than will actually be necessary for most reasonable applications. The dots referred to can in one embodiment be formed in halftone cells in a manner well known in the art.

Since the screen angles are not coincident, the present invention is robust to registration errors. Also, since the number of different halftone screen angles have not been increased, this configuration does not introduce additional moiré, rosette or other artifacts over conventional four-colorant printing. It is to be understood that the colors, angle and frequency are provided for discussion purposes and the present invention is equally applicable to other colors, angles and frequencies.

By allowing the opposing colorants to print simultaneously, a number of key advantages are gained for image processing. The first is that the colorants can be chosen to aid in neutral balance. Frequently, the primary colors (CMY) are chosen to maximize different regions of the color gamut without regard to the neutral balance. This is a particularly important issue in ink-jet applications where the selection of dyes is limited. The addition of an extra color can both increase the gamut as well as aid in neutral gray replacement. For instance, there may be two ways of rendering a light neutral color. One is by printing black dots and the other by printing a mixture of, for example, red and cyan in a dot-off-dot configuration. Assuming the average color is the same in both cases, it can be expected that the texture will be less visible from the approach of mixing the red and cyan. Thus, using the present invention makes it possible to use multiple colors to replace the use of black to determine gray tones. For example, in the present invention it will be possible to print light and neutral tones such as light grays. This is opposed to printing gray colors using the black dots averaged over a white space. Since the black dot is, in many cases, the most visible color, even independent of the print angle, due to its inherent darkness, there will be less black dots used to create a gray tone, thereby increasing the graininess of an output print.

On the other hand, by using lighter and more neutral tones of the opposing colors, it is possible to print more dots, and each of the dots will be a little bit lighter in terms of less colorant being used, allowing for a neutral that is less grainy in an output image. This is a benefit of using the opposing colors to be printed at the same time. Particularly, the merging of these colors provides an improved neutral tone and gray color processing.

A related issue is the trade-off between colorant area coverage limitations and smoothness of sweeps from neutral to off-neutral regions. Often in printing, such as for ink jet printing, mainly K is used to render dark neutrals, in order to constrain the maximum area coverage near black. However, this can lead to an unstable and non-smooth response as one moves from neutral locations at the point where the colored ink starts printing. The use of opposed colorants around the neutral axis enables a smooth transition. In addition, opposed colorants use less total ink area coverage than would be required if conventional four-colorant (CMYK) or other "hi-fi" systems were used.

Thus, mixing opposing colorants allows for the movement across the neutral axis in a smooth transition. This concept can be explained in an example of a color sweep from cyan through red. Moving across this color spectrum there will be some neutral or gray level. Therefore when the image sweeps from orange to cyan, if black is used for the neutral or gray level, there will be a transition from red to all black to cyan. What will happen is that the various colorants will need to be turned on and off which can result in a clear step distinction in the color sweep. However, since the present invention can use a combination of colors (such as opposed colors cyan and red as well as orange) to create the neutral grays, there is no movement down to a zero colorant disbursement of the cyan and/or red. Rather the transition moves in a more balanced manner of increasing and decreasing levels of these colorants to create greater uniformity in this transition.

In general, a halftone configuration that allows the coexistence of opposed colorants affords greater flexibility in the design of hi-fi separation algorithms. It is to be appreciated that while dot-off-dot type printing does not have registration tolerances as tight as dot-on-dot printing, misregistration and dot-growth problems are factors to take into consideration when developing a dot-off-dot printing system using the inverse halftone screen of the present invention. Therefore, the following discussion is provided to describe an example of how the combined area coverage of two opposed colorants (in this example, cyan and orange) can be limited to minimize registration artifacts. It is first considered that the contone (e.g. 8-bit) inputs are C (for cyan), and O (for orange), for their respective halftone screens. A constraint of the present invention is to minimize or eliminate the possibility of overlap between these two colorants. Using the present inverted halftone screen design, this means it is required that:

$$O+C<=255, \tag{1}$$

with equality only when O=255 or C=255. Therefore, the following constraint is imposed:

$$O<=f(C)<=255-C, \tag{2}$$

where f(C) serves as an upper boundary for the amount of orange allowed to coexist with the cyan.

An example of f(C) is:

$$f(C)=255*(1-C/255)^2 \tag{3}$$

Figure 5:
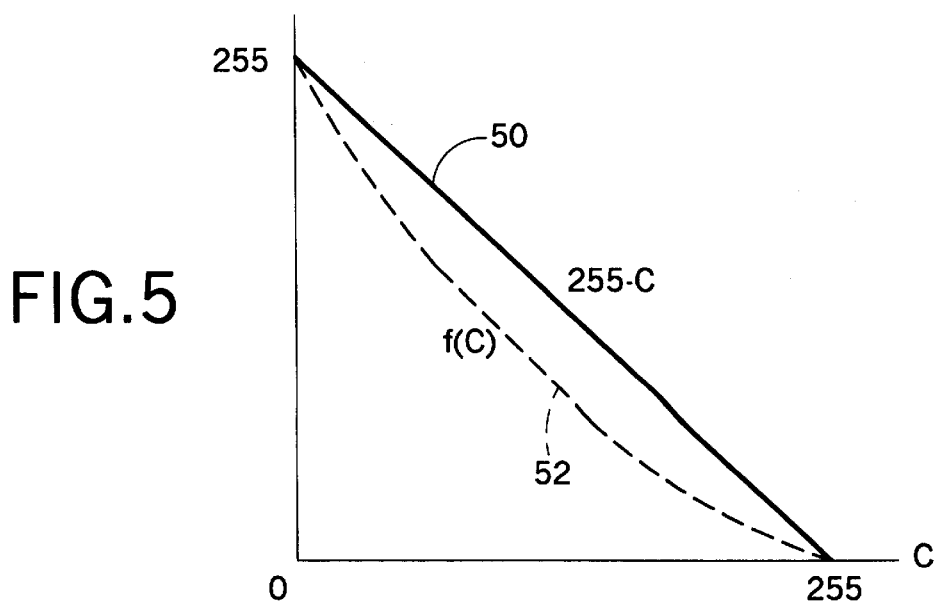
FIG. 5 is a graph showing the printing parameters allowed in accordance with the teachings of the present invention.

A graph representing the foregoing concepts is provided in FIG. 5. Outer boundary line 50 shows the 255−C restriction. Lower boundary curve f(C) 52 shows a more refined restriction parameter which can be used to eliminate misregistration concerns and spot overlap which might occur due to spot growth.

In creating the hi-fi separations, the two opposed colorants are then designed to satisfy constraint (2). Note that the conventional condition of O and C being mutually exclusive reduces to the special case where f(0)=255; and f(C)=0 when C>0. The proposed configuration thus allows for a smoother transition from regions of color space that require cyan to those that require orange.

It is to be appreciated that while the foregoing examples have involved the use of cyan and orange, the present concepts are equally applicable to other color combinations, non-gamut colors such as silver or gold with black, fluorescent colors and their nearest equivalent or opposed color (e.g. fluorescent red with cyan), or varying intensity of the same color (e.g. dark cyan or light cyan, as will images other than 8-bit images).

Additionally, whereas FIG. 5 shows a specific constraint in accordance with the function f(C), other functions may be available which are equally applicable, and a key point to the constraints designed above is to prevent the overlapping of dots due to the misregistration or oversizing of dots during the printing process.

The preceding description has discussed the present invention in connection with a hi-fi printing system which uses more than four colorants (i.e. CMYK plus at least one additional color such as red, green, blue, silver, gold, etc.). However, the present invention may be implemented in a printing system which uses less than four colors as well as a system that does not use a black (K) colorant. Rather, instead of the black colorant, an opposing color of primary colors (e.g. CMY) may be used (e.g. one of red, orange, green, blue or other appropriate color) which would still allow generation of the various hues required for printing including a black color obtained by the combination of colorants used within the system. Under such a configuration, a print imaging system not using black may be implemented which still uses the four-level coloring configuration.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A digital printing apparatus configured to print an image having at least two different colors, comprising:
   a first halftone screen, having a plurality of pixels, associated with a first of a plurality of colorants including cyan, magenta, yellow, or black; and
   a second halftone screen associated with a second colorant, which is different than any of the first colorants, having a plurality of pixels, the pixels of the first halftone screen not overlapping the pixels of the second halftone screen when the sum of the two colorants is less than or equal to 100% coverage.

2. The digital printing apparatus according to claim 1, wherein the colorant associated with the first halftone screen is one of a substantially same hue and a substantially opposite hue from the colorant associated with the second halftone screen.

3. The digital printing apparatus according to claim 1 wherein a colorant associated with the first halftone screen is of a substantially opposite hue from a colorant associated with the second halftone screen.

4. The digital printing apparatus according to claim 1, wherein the first and second colorants satisfy a constraint that limits the sum of the two colorants to less than 100% when both of the colorants are present.

5. The digital printing apparatus according to claim 1 wherein the first halftone screen and the second halftone screen are used to generate one of a xerographic, ink-jet or acoustic ink printed image.

6. The digital printing apparatus according to claim 1 further including a third halftone screen, a fourth halftone screen and a fifth halftone screen, the third, fourth, and fifth halftone screens each having, an angle different from the first angle and different from each other's angle.

7. The digital printing apparatus according to claim 5 configured to print five different colors associated with the five halftone screens, wherein the five halftone screens are arranged along four angles.

8. The digital printing apparatus according to claim 1 further including a third halftone screen and a fourth halftone screen, the third and fourth halftone screens each having an angle different from the first angle and different from each other's angle, the four halftone screens configured to print with four colors, wherein the four colors are other than black.

9. The digital printing apparatus according to claim 1 configured such that opposing colors of the first halftone screen and the second halftone screen are printed substantially simultaneously.

10. The digital printing apparatus according to claim 9 wherein the simultaneous printing of opposed colors is constrained in accordance with the following equation when used in a system of N bits:

$$A+B<=X,$$

wherein $X=2^N-1$, A is a first colorant associated with the first halftone screen, and B is a second colorant of a substantially opposing hue.

11. The digital printing apparatus according to claim 10 wherein a further constraint on the simultaneous printing is:

$$A<=f(B)<=X-B,$$

wherein f(B) is an upper boundary for an amount of A colorant allowed to coexist with the B colorant.

12. The digital printing apparatus according to claim 11 wherein the f(B) upper boundary is defined as:

$$f(B)=X*(1-B/X)^2.$$

13. In a printing apparatus capable of printing a plurality of colorants, a method of simultaneously printing a first colorant and a second colorant of the same or opposite hues, comprising the steps of:
   forming a first halftone screen having a plurality of pixels of the first colorant;
   determining a constraint that limits the sum of the two colorants to be always less than or equal to 100% coverage;
   forming a second halftone screen having a plurality of pixels of the second colorant, wherein the pixels of the second halftone screen do not overlap with the pixels of the first halftone screen as long as the constraint is satisfied; and
   printing the colorant associated with the first halftone screen and the colorant associated with the second halftone screen.

14. The method according to claim 13 wherein the second halftone screen is inverse to the first halftone screen.

15. The method according to claim 13 wherein the printing of the two opposed colors includes printing proportionate amounts of the two opposed colors such that a smooth transition in the color space is achieved.

16. The method according to claim 13 wherein the printing of the two opposed colors includes printing proportionate amounts of the two opposed colors such that a gray output color is obtained.

17. The method according to claim 13 further including:
   forming a third, fourth, and fifth halftone screen each with their own plurality of dots; and
   positioning the third, fourth, and fifth halftone screens at angles each different from the first angle and at angles different from each other.

18. The method according to claim 13 wherein the step of printing includes printing of colors of substantially the same hue but of different densities.

19. In a printing apparatus capable of printing a plurality of colorants, a method of simultaneously printing a first colorant and a second colorant of a same or an opposite hue of the first colorant, comprising the steps of:

forming a first halftone screen having a plurality of pixels of the first colorant;

positioning the first halftone screen at a first angle;

determining a constraint that limits the sum of the two colorants to be always less than or equal to 100% coverage;

forming a second halftone screen having a plurality of pixels of the second colorant, which are at the first halftone screen angle, wherein the pixels of the second halftone screen do not overlap with the pixels of the first halftone screen as long as the constraint is satisfied; and printing the color associated with the first halftone screen and the colorant associated with the second halftone screen.

* * * * *